United States Patent
Cuk

(10) Patent No.: US 7,109,877 B2
(45) Date of Patent: Sep. 19, 2006

(54) FAULT MONITORING APPARATUS AND METHOD

(76) Inventor: Nikola Cuk, 690 Tudor Avenue, North Vancouver, British Columbia (CA) V7R 1W9

( * ) Notice: Subject to any disclaimer, the term of this patent is extended or adjusted under 35 U.S.C. 154(b) by 455 days.

(21) Appl. No.: 10/627,865

(22) Filed: Jul. 28, 2003

(65) Prior Publication Data

US 2005/0024218 A1 Feb. 3, 2005

(51) Int. Cl.
*G08B 21/00* (2006.01)
*H01N 85/04* (2006.01)
*H01N 71/10* (2006.01)
*H01N 71/20* (2006.01)
*H02N 5/04* (2006.01)
*G01R 29/12* (2006.01)

(52) U.S. Cl. .................. 340/638; 340/638; 340/664; 337/158; 337/168; 337/171; 337/172; 361/104; 361/105; 361/106; 324/457; 324/458

(58) Field of Classification Search ................ 340/638, 340/664; 337/168, 171, 172, 158; 361/104–106; 324/457–458
See application file for complete search history.

(56) References Cited

U.S. PATENT DOCUMENTS

| | | | |
|---|---|---|---|
| 4,249,170 A | 2/1981 | Cham et al. | 340/646 |
| 4,307,369 A * | 12/1981 | Jackson, Jr. | 337/282 |
| 4,514,723 A * | 4/1985 | Leal | 340/638 |
| 4,616,207 A * | 10/1986 | Knapp et al. | 338/32 H |
| 4,661,807 A * | 4/1987 | Panaro | 340/638 |
| 5,078,078 A | 1/1992 | Cuk | 116/272 |
| 5,159,319 A | 10/1992 | Dunk et al. | 340/646 |
| 5,283,553 A * | 2/1994 | Ishii et al. | 340/664 |
| 5,343,192 A * | 8/1994 | Yenisey | 340/639 |
| 5,347,418 A * | 9/1994 | Ando et al. | 361/104 |
| 5,396,172 A | 3/1995 | Lat et al. | 324/547 |
| 5,455,506 A | 10/1995 | Mimeault et al. | 324/547 |
| 5,534,853 A | 7/1996 | Pioch | 340/646 |
| 5,623,891 A | 4/1997 | Miller | 116/271 |
| 5,739,737 A * | 4/1998 | Hatton | 337/206 |
| 5,939,991 A * | 8/1999 | Deng | 340/638 |
| 6,028,510 A * | 2/2000 | Tamam et al. | 340/458 |
| 6,133,723 A | 10/2000 | Feight | 324/133 |
| 6,429,662 B1 | 8/2002 | Cuk et al. | 324/547 |
| 6,597,291 B1 * | 7/2003 | Tsui | 340/686.1 |
| 2003/0117145 A1 | 6/2003 | Cuk et al. | 324/547 |

OTHER PUBLICATIONS

"High Voltage Ceramic Capacitors", www.avxcorp.com, TPC, pp. 15-20.
"Live-Line Indication Applications", www.morganelectroceramics.com, pp. 1-4.
"S&C Type XS Fuse Cutouts", S&C Electric Company, Dec. 7, 1998, pp. 1-12.

* cited by examiner

*Primary Examiner*—Thomas Mullen
*Assistant Examiner*—Lam Pham

(57) ABSTRACT

A fault condition monitoring apparatus for use with a fuse cutout includes a housing operable to be supported by the fuse cutout. The housing has first and second contacts operable to make electrical contact with fuse contacts on the fuse cutout when the housing is supported by the fuse cutout. A current sensor is mounted inside the housing and is connected to the first and second contacts. A signaling device is coupled to the current sensor and is operable to cause a signal to be produced when current sensed by the current sensor meets a criterion.

45 Claims, 8 Drawing Sheets

| FUSE | SIGNALLING DEVICE | STATUS |
|---|---|---|
| INTACT | OFF | NORMAL |
| INTACT | ON | - |
| BLOWN | OFF | INTERNAL FAULT |
| BLOWN | ON | EXTERNAL FAULT |
FIG. 7
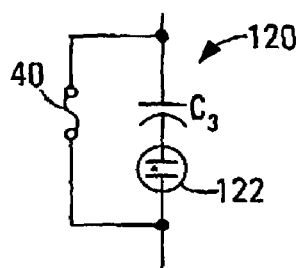
FIG. 8
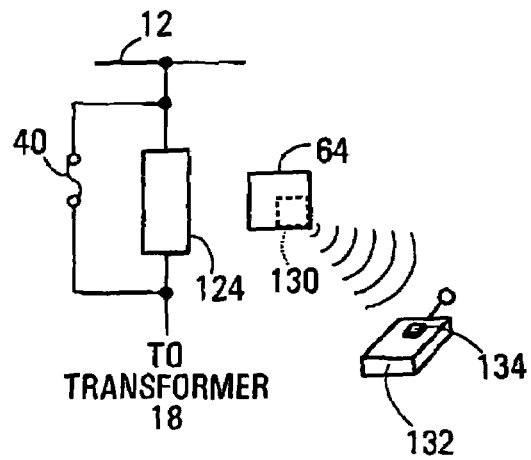
FIG. 9

FAULT MONITORING APPARATUS AND METHOD

BACKGROUND OF THE INVENTION

1. Field of Invention

This invention relates to high voltage power distribution systems and more particularly to apparatus and methods for monitoring for a fault condition in such systems

2. Description of Related Art

Power distribution transformers in a high voltage power distribution system are susceptible to internal and external faults. Internal faults may occur due to gradual degradation and/or sudden breakdown of insulating properties of internal structures of the transformer resulting from thermal, electrical and mechanical stresses. The loss of insulating properties of internal structures can lead to a short circuit within the transformer, creating an internal arcing fault. Such fault may occur in a winding of the transformer, for example. A short circuit of this type usually causes burning of the winding, ultimately resulting in an open circuit in the primary winding, whether the fault was initiated in the primary or secondary winding. When such a fault occurs, a fuse, normally installed in series between the high voltage line and the transformer, blows, interrupting current flow to the transformer. Attempts to re-energize the transformer by replacing the fuse can result in further arcing within the transformer and this can rapidly increase the pressure inside the transformer to the point of explosion where burning oil and shards of th transformer casing may be rapidly expelled at the risk of injuring persons and property nearby.

External faults may occur due to insulation failures in a secondary circuit connected to the secondary winding of the transformer. External faults are normally detectable by inspection of the secondary circuit. Re-energizing a transformer having a fault in the secondary circuit do s not normally cause an increase in pressure inside the transformer sufficient to create an explosive threat. Internal faults are thus normally more dangerous than external faults.

Various mechanical devices have been devised to detect internal faults, most of which rely on pressure build-up caused by arcing to activate a mechanism. Such devices are described in U.S. Pat. Nos. 5,078,078, 5,623,891, and 6,429,662, for example. Each of these devices employs an efficient but relatively elaborate mechanism to operate a signal device in response to a pressure surge in a transformer caused by an internal fault.

SUMMARY OF THE INVENTION

In accordance with one aspect of the invention, there is provided a fault condition monitoring apparatus for use with a fuse cutout. The apparatus includes a housing operable to be supported by the fuse cutout, the housing having first and second contacts operable to make electrical contact with fuse contacts on the fuse cutout when the housing is supported by the fuse cutout. The apparatus further includes a current sensor inside the housing and connected to the first and second contacts and includes a signaling device coupled to the current sensor and operable to cause a signal to be produced when current sensed by the current sensor meets a criterion.

The housing may have a profile of a fuse operable to be held by the fuse cutout.

The housing may have first and second opposite ends and the first and second contacts may be on the first and second opposite ends.

The first and second contacts may be operable to mechanically mate with the fuse contacts on the fuse cutout.

The first and second contacts may be operable to mechanically mate with line connectors on the fuse cutout.

The first and second contacts may include first and second supports respectively, the first and second supports being operable to cooperate with respective line connectors on the fuse cutout to support the housing.

At least one of the first and second contacts may include a pull-ring.

The current sensor may include a voltage divider connected between the first and second contacts.

The voltage divider may include a capacitor network.

The signaling device may include a visual indicator operable to produce a visual signal operable to be seen from outside the housing. The visual indicator may include a light emitting device. A transparent cover may be disposed at an end of the housing, for covering the light emitting device, while permitting light from the light emitting device to be viewed through the transparent cover.

The signaling device may include an audible indicator operable to produce an audible signal. The signaling device includes a transmitter operable to produce a control signal for reception by a remotely located annunciator. The apparatus may further include a remotely located annunciator for receiving the control signal from the signaling device. The remotely controlled annunciator may include at least one of an audio and visual indicator.

In accordance with another aspect of the invention, there is provided a method of monitoring for a fault condition in a system comprising a fuse cutout connected between a supply conductor and an electrical device. The method involves connecting to the fuse cutout a housing containing a current sensor, such that the current sensor is electrically connected to fuse contacts on the fuse cutout. The method further involves actuating a signaling device when current sensed by the current sensor meets a criterion.

In accordance with another aspect of the invention, there is provided an apparatus for monitoring for a fault condition in a system comprising a supply conductor and an electrical device. The apparatus may include a fault condition monitoring apparatus as described above. The apparatus may further include a fuse cutout having fuse contacts connected between the supply conductor and the electrical device. The apparatus may further include a fuse connected between the fuse contacts.

In accordance with another aspect of the invention, there is provided a fuse cutout apparatus comprising an insulator, first and second fuse contacts on opposite ends of the insulator respectively, for holding a fuse, a current sensor inside the insulator and connected to the first and second fuse contacts and a signaling device coupled to the current sensor and operable to cause a signal to be produced when current sensed by the current sensor meets a criterion.

In accordance with another aspect of the invention, there is provided a method of monitoring for a fault condition in a system comprising a supply conductor and an electrical device. The method involves connecting, between the supply conductor and the electrical device, a fuse cutout having fuse contacts, an insulator and a current sensing circuit connected between the fuse contacts and located inside the insulator. The method further involves actuating a signaling device coupled to the current sensing device when current sensed by the current sensing circuit meets a criterion.

In accordance with another aspect of the invention, there is provided a fault condition monitoring apparatus for use with a fuse cutout. The apparatus includes a housing operable to be supported by the fuse cutout, the housing having first and second contacts operable to make electrical contact with fuse contacts on the fuse cutout when the housing is supported by the fuse cutout. The apparatus further includes current sensing means inside the housing and connected to the first and second contacts for sensing current between the first and second contacts and signaling means coupled to the current sensor, for causing a signal to be produced when current sensed by the current sensing means meets a criterion.

In accordance with another aspect of the invention, there is provided a fuse cutout apparatus comprising an insulator, means for holding a fuse, including first and second fuse contacts on opposite ends of the insulator respectively, current sensing means inside the insulator and connected to the first and second fuse contacts for sensing current between the first and second contacts and signaling means coupled to the current sensor for causing a signal to be produced when current sensed by the current sensing means meets a criterion.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention,

FIG. 7 is a tabular representation associating fault status with fuse and indicator conditions;

FIG. 8 is schematic representation of a first alternate current sensor and indicator arrangement;

FIG. 9 is a schematic representation of a second alternate current sensor and indicator arrangement;

DETAILED DESCRIPTION

Figure 1:
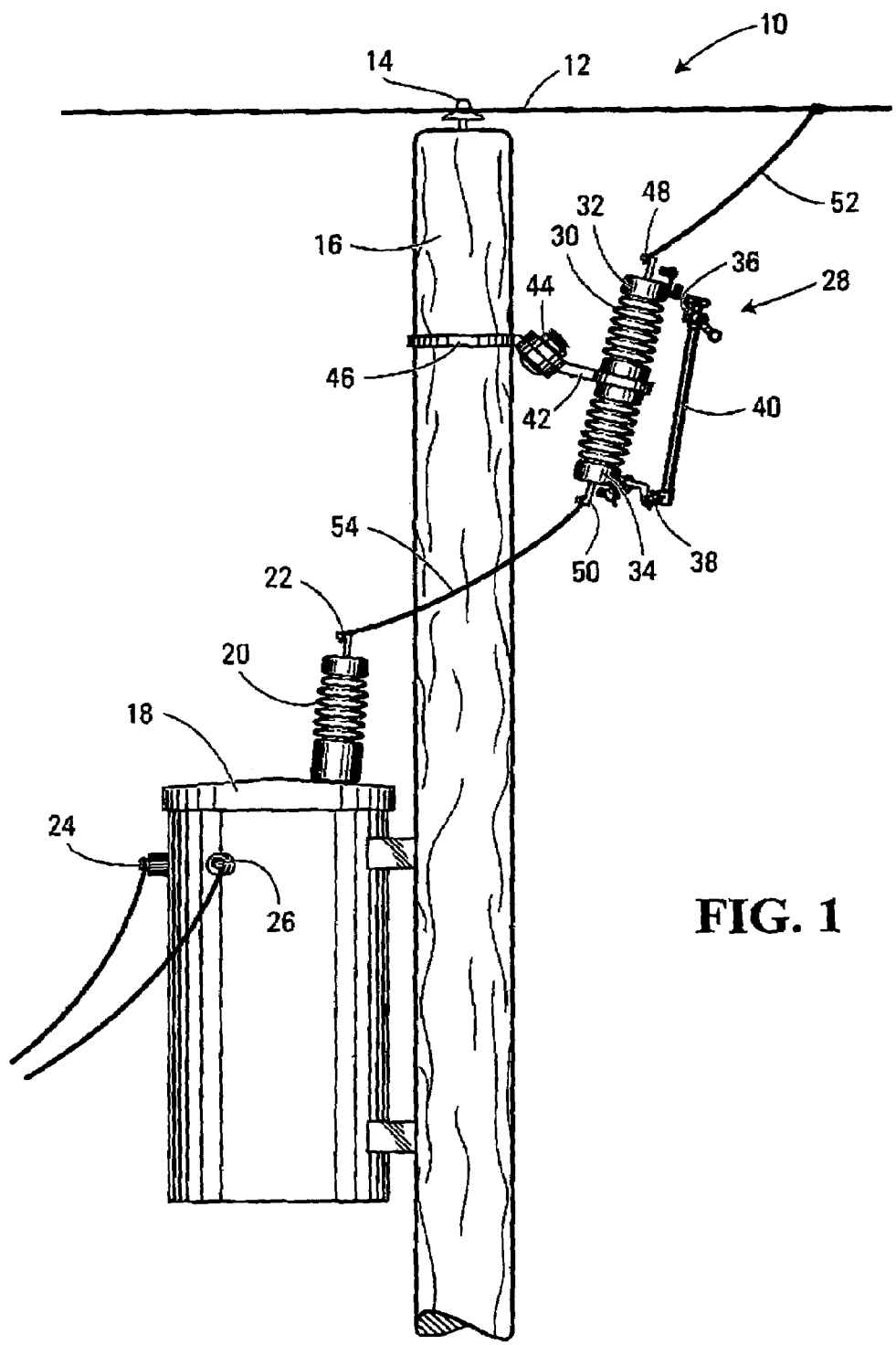
FIG. 1 is a schematic representation of a high voltage pow r distribution system incorporating an apparatus for monitoring for a fault condition, according to a first embodiment of the invention.

Referring to FIG. 1, a high voltage power distribution system incorporating an apparatus according to a first embodiment of the invention is shown generally at 10. The system includes a high voltage line 12 carrying current associated with a single phase of a three phase power distribution system. The high voltage line 12 may carry a voltage of approximately 4 to 25 kV, for example. The high voltage line 12 is supported by an insulator 14 secured to a conventional power pole 16. To the power pole 16 is mounted a single-phase transformer 18 having a primary terminal bushing 20 having a primary terminal 22 connected to a primary winding (not shown) of the transformer. The transformer 18 also has secondary terminals 24 and 26, respectively, connected to a secondary winding (not shown) of the transformer.

To the power pole 16 is connected the apparatus according to the first embodiment of the invention, as shown at 28. In this embodiment, the apparatus 28 includes a porcelain insulator 30 having first and second opposite ends 32 and 34, respectively, with first and second fuse contacts 36 and 38 being connected to the first and second opposite ends, respectively, for holding a fuse 40. The insulator 30 has a bracket 42 connect d thereto which is s cured using a fastener as shown at 44 to a pole bracket 46, for securing the apparatus 28 to the power pole 16. The insulator 30 also has first and second line connectors 48 and 50 electrically connected to the first and second fuse contacts 36 and 38, respectively. A first wire 52 is connected between the high voltage line 12 and the first line connector 48 and a second wire 54 is connected between the second line connector 50 and the primary terminal 22 of the transformer 18. Thus, current drawn by the transformer 18 is drawn through the first wire 52 to the first line connector 48, through the fuse connector 36, through the fuse 40, through the second fuse connector 38 to the second line terminal 50 and through the second wire 54 to the primary terminal 22 on the transformer.

Figure 2:
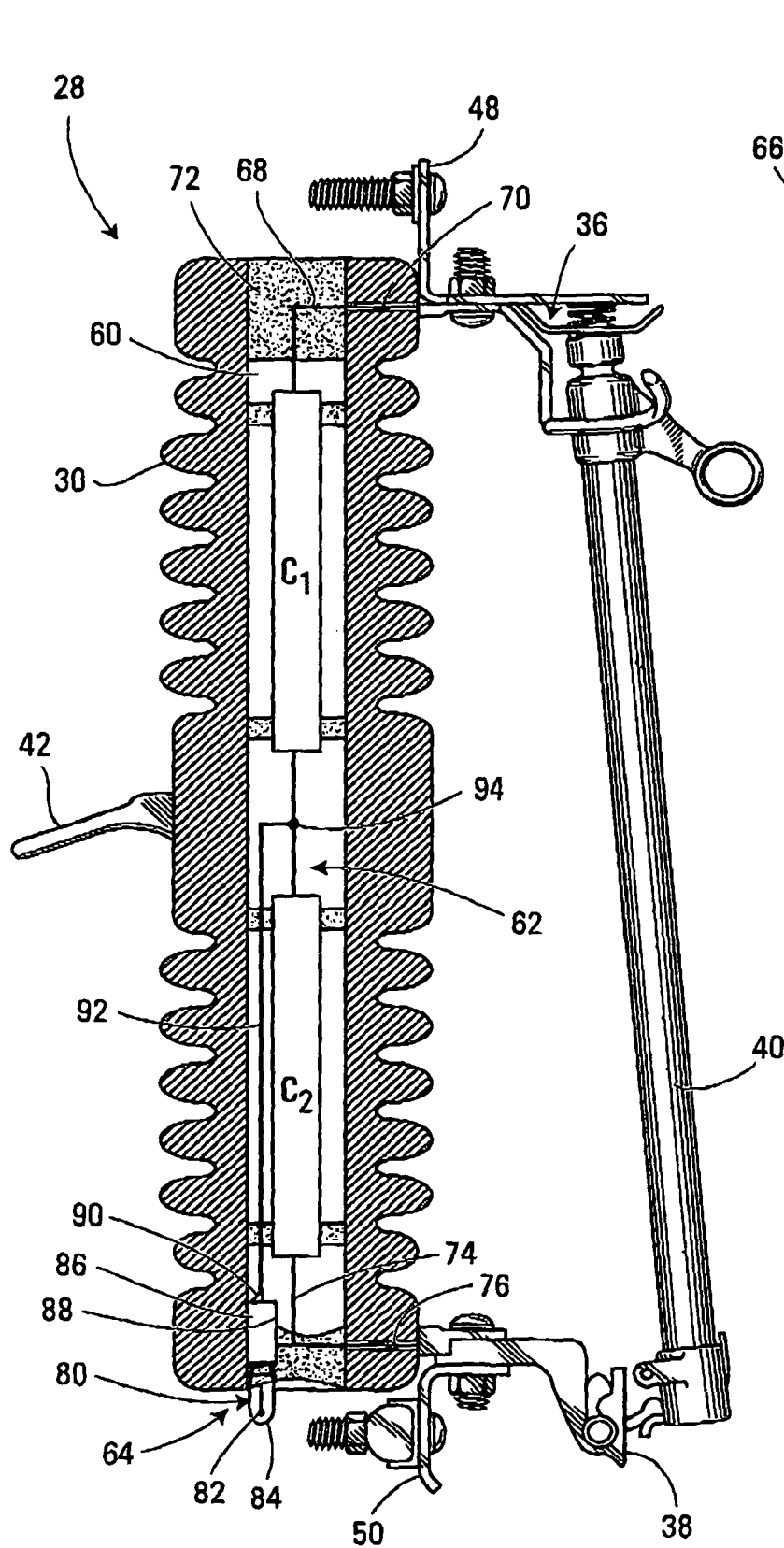
FIG. 2 is a partial cross sectional view of the apparatus for monitoring for a fault condition shown in FIG. 1.

Referring to FIG. 2, the apparatus 28 is shown in greater detail and in partial cross-section. The insulator 30 has a hollow core 60 into which is mounted a current sensor shown generally at 62 connected to the first and second fuse contacts 36 and 38 and to the first and second line connectors 48 and 50, respectively. In addition, a signaling device as shown generally at 64 is coupled to the current sensor 62 and is operable to cause a signal to be produced when current sensed by the current sensor 62 meets a criterion. In this case, the criterion may be that the current flow through the current sensor 62 exceeds a predefined value.

Figure 3:
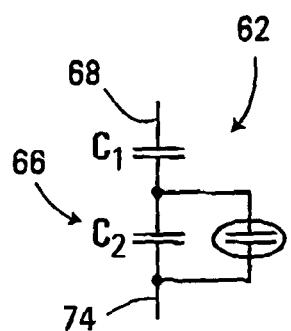
FIG. 3 is a schematic diagram of a circuit implementing a current sensor and a signal device of the apparatus shown in FIG. 2.

In the embodiment shown, the current sensor 62 includes a voltage divider, shown schematically in FIG. 3 at 66. The voltage divider 66 includes a capacitor network including a first capacitor C1 and a second capacitor C2 connected in series. Referring to FIGS. 2 and 3, a first terminal 68 of capacitor C1 is connected to the first fuse contact 36 and to the first line connector 48 through wire extending through a small opening 70 in the insulator 30. Potting material 72, for example, may be inserted into the hollow core 60 to seal the core against moisture ingress. Some of the potting material 72 may extend into the opening 70, thereby sealing the opening from water ingress as well. A second terminal 74 of the voltage divider 66 may include a wire operable to pass through a second opening 76 in the insulator to connect to the second fuse contact 38 and the second line connector 50. Again, potting material 78 or other suitable sealing substance is received in the opening 76 to seal the hollow core 60 from moisture ingress and to seal the opening 76 from moisture ingress.

In the embodiment shown, the signaling device 64 includes an electric light 80 having a light emitting filament 82 and a transparent cover 84 disposed at the second end 34 of the insulator 30 for covering the light emitting filament 82 while permitting light from the filament to be viewed through the transparent cover 84. The electric light 80 may be secured in place by potting material 78 and may be connected to a receptacle 86 having a first terminal 88 and a second terminal 90. The first terminal 88 is connected to the second voltage divider terminal 74 and the second terminal 90 is connected through a wire 92 to a junction point 94 between the capacitors C1 and C2. Capacitors C1 and C2 may be high voltage ceramic capacitors of the HB/HF type-type 11 manufactured by AVX Corporation and may have values such as C1=100 pF and C2=10,000 pF with a voltage rating of about 8 kV to about 15 kV RMS, for example. A transient voltage protection device (not shown) such as a metal oxide surge arrestor or spark gap, for example, may be wired across all or part of the voltage divider to protect the components thereof against voltage transients.

Figure 4:
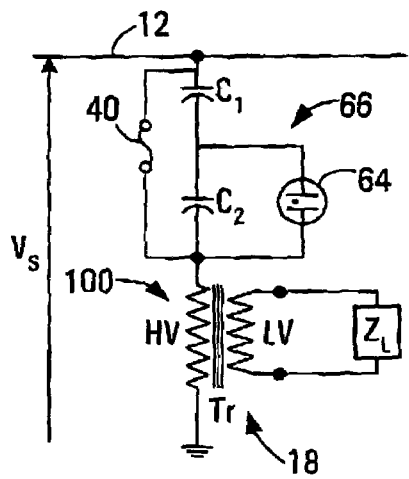
FIG. 4 is a schematic representation of the apparatus shown in FIG. 2 installed in the high voltage power distribution system shown in FIG. 1 and depicting a condition where there is no fault.
Figure 5:
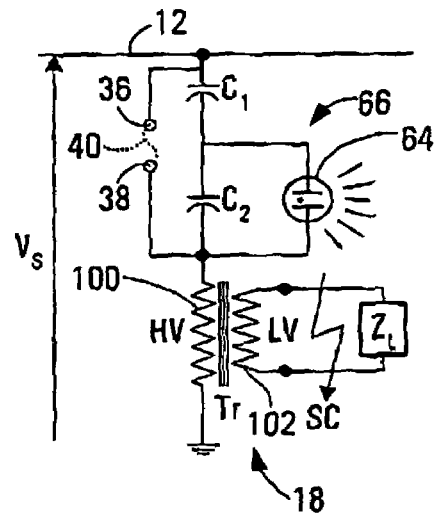
FIG. 5 is a schematic representation of the apparatus shown in FIG. 2 installed in the high voltage power distribution system shown in FIG. 1 and depicting a condition where there is a fault in the secondary circuit connected to a transformer of the high voltage distribution system.
Figure 6:
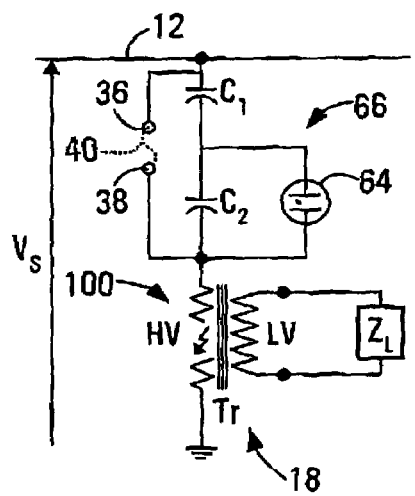
FIG. 6 is a schematic representation of the apparatus shown in FIG. 2 installed in the high voltage power distribution system shown in FIG. 1 and depicting a condition where there is a fault internal to the transformer.

Referring to FIGS. 4, 5 and 6, the operation of the device is described.

Under normal operating conditions, the fuse 40 presents negligible resistance to the circuit and short circuits the voltage divider 66 such that there is no voltage across the signaling device 64. Thus, the signaling device 64 is not active. Current flows from the high voltage line 12 through the fuse 40 and through the primary winding 100 of the transformer 18. Thus, the signaling device 64 is inactive when conditions are normal.

Referring to FIG. 5, in the event of a short circuit in the secondary circuit connected to a secondary winding 102 of the transformer 18, the fuse shown in broken outline at 40 is blown leaving the first and second fuse contacts 36 and 38 open thereby permitting the voltage on the high voltage line 12 to appear across the series combination of the voltage divider 66 and the primary winding 100 of the transformer 18. The voltage across the voltage divider 66 is divided between capacitors C1 and C2 such that sufficient voltage appears across capacitor C2 to be applied to the signaling device 64 causing it to be active, thus emitting light operable to be seen from outside the insulator shown at 30 in FIGS. 1 and 2. Thus, the condition where the fuse is blown and the signaling device 64 is active, indicates that there is a short circuit across the secondary circuit external to the transformer 18. The current flowing through the voltage divider is limited by the voltage divider itself and only a very low voltage appears across the primary winding of the transformer, this voltage being non-hazardous to maintenance personnel.

Referring to FIG. 6, if there is a short circuit in the primary winding 100 of the transformer 18, the primary winding usually arcs and burns through and the fuse 40 blows, thereby opening the first and second contacts 36 and 38. The circuit comprised of the voltage divider 66 and primary winding 100 of the transformer is thus open and remains open even if the fuse is replaced due to the open circuit in the primary winding created by the arc and burning through of the primary winding. As a result of this open circuit, the signaling device 64 is not active even after a replacement fuse is installed.

Referring to FIG. 7, a tabular representation of the conditions of the fuse 40 and signaling device 64 and corresponding status is presented. In a first state 110, the fuse 40 is intact and the signaling device 64 is off. This indicates a normal status of the transformer 18. A second "theoretical" state is where the fuse 40 is intact and the signaling device 64 is on, however, this is an impossible state since the fuse 40 short circuits the voltage divider 66 when intact and when the voltage divider is short circuited, the signaling device 64 cannot be on. Thus, this second condition 112 is impossible to achieve. In a third condition 114, the fuse 40 is blown and the signaling device 64 is off and this indicates an internal fault in the transformer 18. In a fourth condition 116, the fuse 40 is blown and the signaling device 64 is on and this indicates an external fault in the transformer 18.

Knowledge of whether the transformer 18 has experienced an internal or external fault is important to the safety of personnel servicing the transformer since, if the fault is internal excessive pressures can exist inside the transformer 18 creating risk of explosion. Thus, when the fuse 40 is blown and the signaling device 64 is not active, service personnel will know to take extra caution In servicing the transformer 18 as it is susceptible to explosion on re-energization.

It will be appreciated that other current sensing circuits may be used, such as the one shown at 120 in FIG. 8, where a capacitor C3 and neon light 122, for example, are connected in series and the fuse 40 is connected in parallel across the series combination of the capacitor C3 and the neon light 122. Alternatively, it will be appreciated that other, more elaborate circuits such as electronic circuits may be used and that, in general, the apparatus includes a current sensor 62 in parallel with the fuse 40 connected between the high voltage line 12 and the transformer 18, coupled to a signaling device 64. In the embodiment shown, the signaling device 64 is shown as a visual indicator, however, the signaling device may alternatively or in addition include an audible indicator such as a buzzer, bell or electronic or electrical sound generation circuit.

Referring to FIG. 9, alternatively, the signaling device 64 may include a transmitter as shown at 130 operable to transmit a sonic, ultrasonic infrared, or other electromagnetic signal to a remotely controlled annunciator 132, such as a hand held receiver operable to be held by service personnel, for example. The remotely controlled annunciator 132 may include a signaling device 134, for example. The signaling device 134 may include an audio and/or visual indicator.

Figure 10:
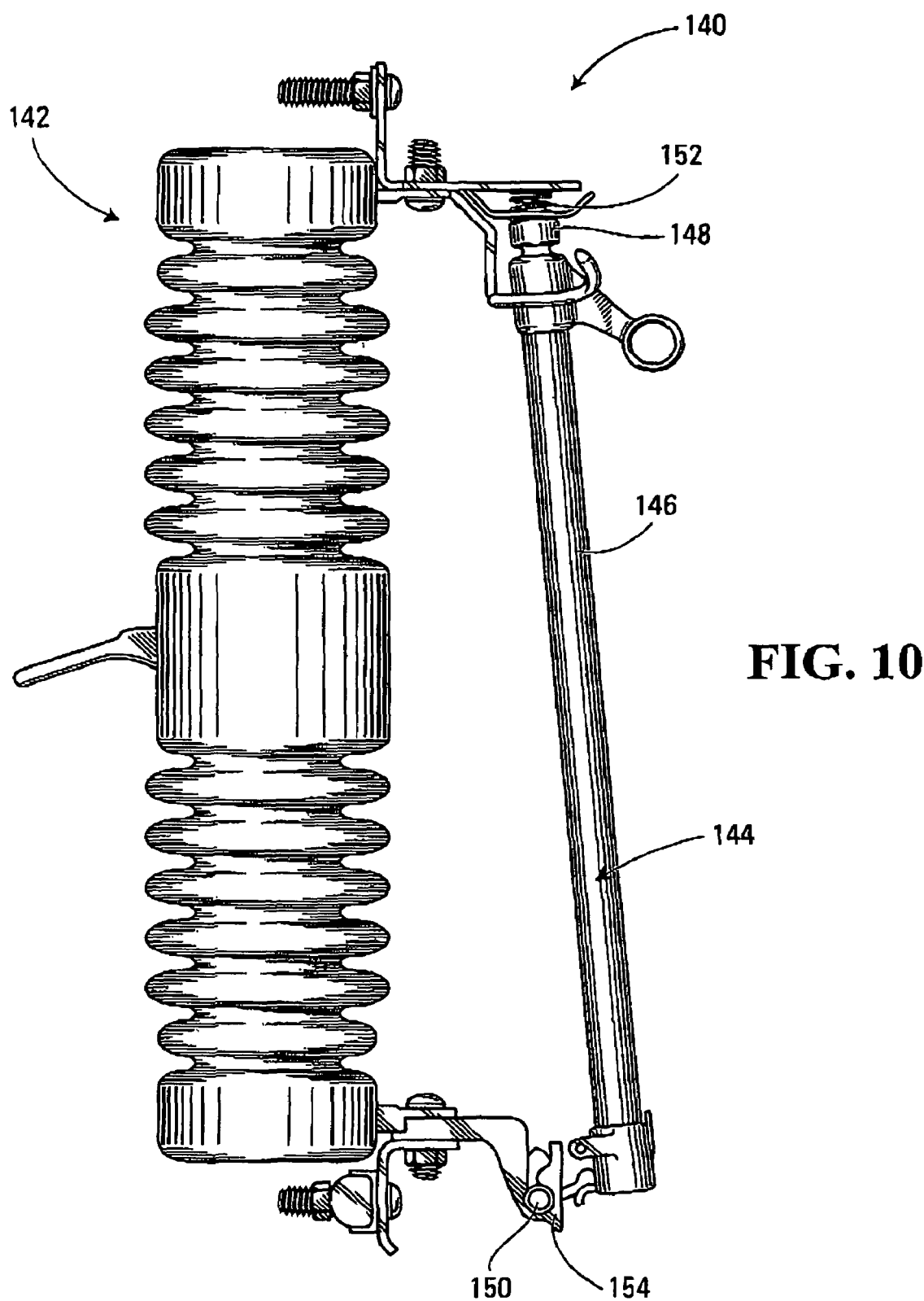
FIG. 10 is a side view of an apparatus according to a second embodiment of the invention shown installed on a conventional fuse cutout.

Referring to FIG. 10, an apparatus according to a second embodiment of the invention is shown generally at 140. In this embodiment, the apparatus 140 includes a conventional fuse cutout shown generally at 142 and a fault condition monitoring apparatus 144 in the shape of a conventional fuse. The fault condition monitoring apparatus 144 includes a cylindrical housing 146 having a profile of a fuse operable to be held by the fuse cutout 142. The housing 146 has first and second contacts 148 and 150, respectively, operable to make electrical contact with fuse contacts 152 and 154 on the fuse cutout 142 when the housing 146 is supported by the fuse cutout 142. The contacts 148 and 150 are operable to electrically and mechanically mate with the fuse contacts on a fuse cutout. In the embodiment shown, at least one of the contacts, in this case the first contact 148, includes a pull ring for convenient installation into a fuse cutout using a conventional lineman tool known as "hot stick" (not shown).

Figure 11:
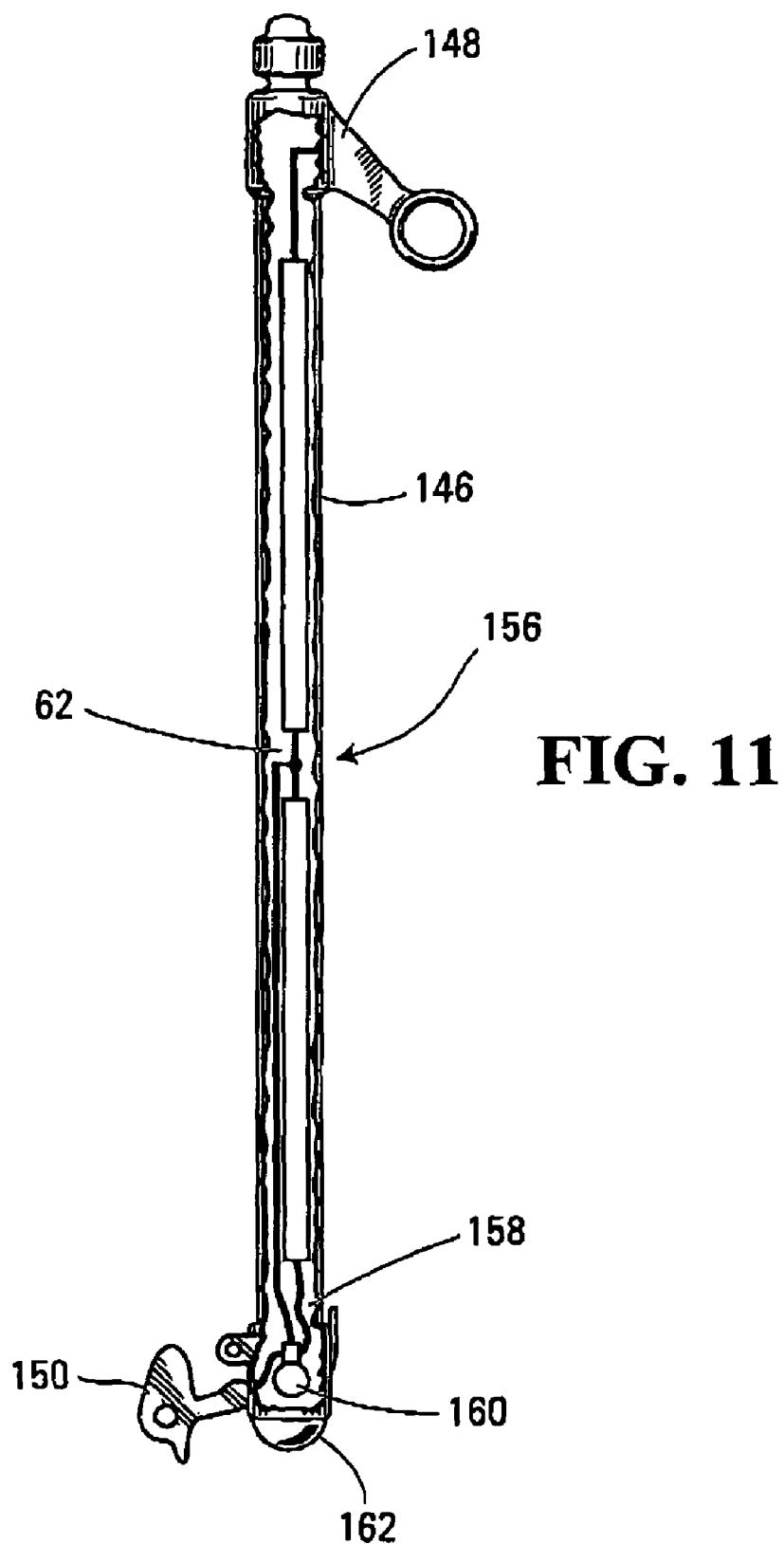
FIG. 11 is a partial cross-sectional view of the apparatus shown in FIG. 10.

Referring to FIG. 11, a current sensor shown generally at 156 is located inside the housing 146 and is connected to the first and second contacts 148 and 150. The apparatus 144 also includes a signaling device shown generally at 158 coupled to the current sensor 156 and operable to cause a signal to be produced when the current sensed by the current sensor 156 meets a criterion. In this embodiment the signaling device 158 includes an electric light 160 and the criterion to be met includes a current measured between the first and second contacts 148 and 150 exceeding a predefined value. The housing 146 is shaped to have the same profile as a conventional fuse that would normally be held by the fuse link shown in FIG. 10. The apparatus 144 is thus a replacement for a fuse (40) in a conventional fuse cutout 142 and thereby allows a standard fuse cutout to hold the apparatus without requiring any special or unique connection means. The fuse cutout that holds the apparatus may b used in parallel, i.e., wired in parallel with an existing conventional fuse cutout holding a conventional fuse. Or, when a fuse is blown on a conventional fuse cutout, the apparatus 144 may be temporarily installed to test the status of the transformer momentarily, before servicing. Thus, the same apparatus 144 may be taken to different sites to determine the status of a transformer at that site.

In the embodiment shown, the current sensor 156 includes a current sensor 62, the same as the current sensor used in the apparatus shown in FIG. 2. In this embodiment, the signaling device 158 is located within the housing 146, near an end portion thereof and the end portion is fitted with a transparent lens 162 to permit light emitted by the electric light 160 to be seen at the bottom of the housing.

As with the apparatus described in connection with the first embodiment, the signaling device 158 may Include a visual indicator and/or an audio indicator and/or a transmitter operable to produce a control signal for reception by a remotely located annunciator such as the one shown at 132 in FIG. 9, for example. The remotely located annunciator 132 may include at least one of an audio and visual indicator, for example, actuated on reception of a signal from a transmitter in the housing 146.

Figure 12:
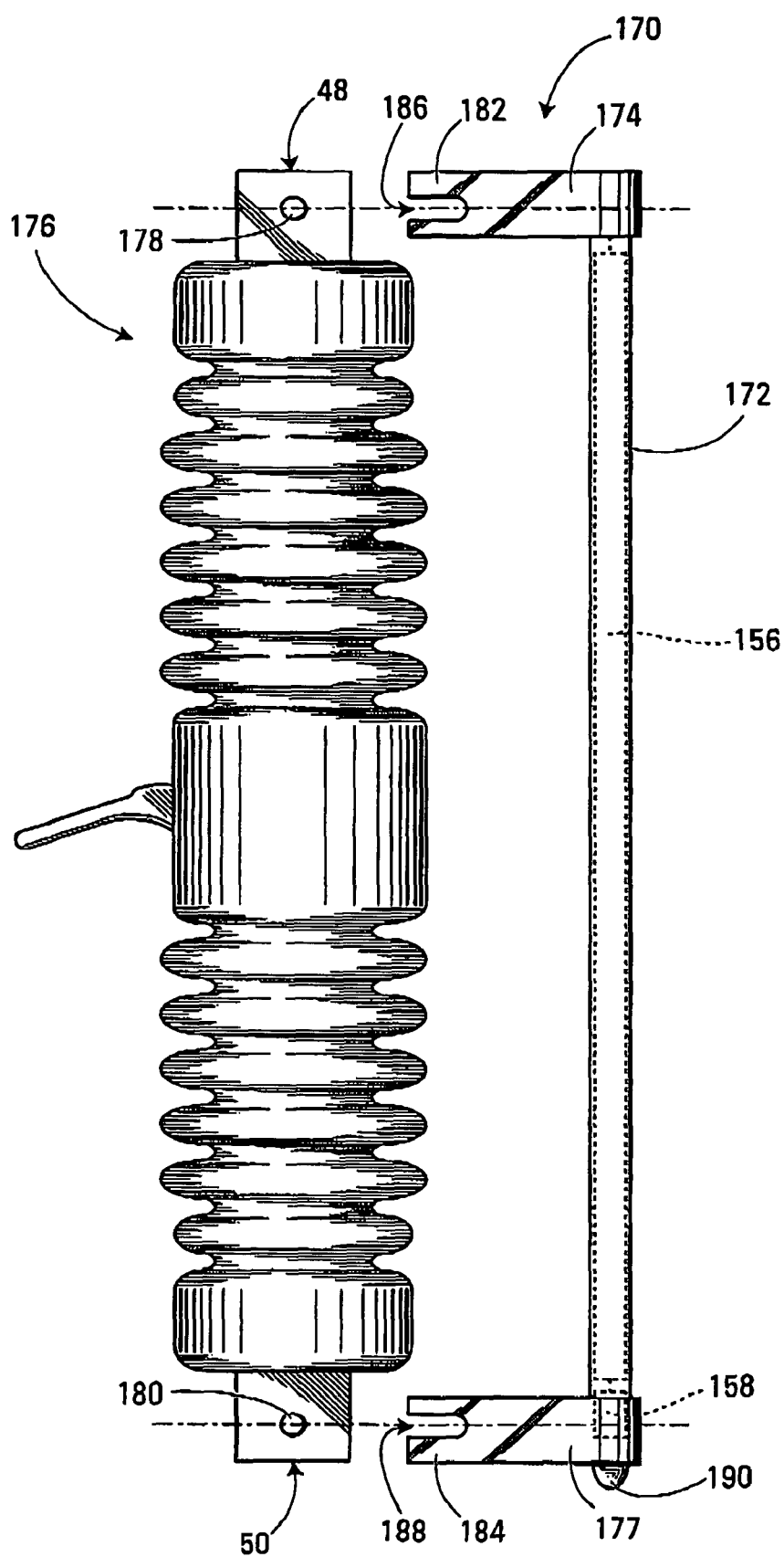
FIG. 12 is a side view of an apparatus according to a third embodiment of the invention, operable to be received on line terminals of a conventional fuse cutout.

Referring to FIG. 12, an apparatus according to a third embodiment of the invention is shown generally at 170 and includes a tubular housing 172 in which is installed the current sensor shown schematically in broken outline at 156 and a signaling device also shown in broken outline at 158. In this embodiment, however, the contacts 148 and 150 of the apparatus shown in FIG. 11 are eliminated and instead, the apparatus 170 includes first and second connectors 174 and 176 at opposite ends of the housing 172 operable to mate with the first and second line connectors 48 and 50 of a conventional fuse cutout shown generally at 176. The first and second line connectors 48 and 50 include spaced apart studs 178 and 180 and the first and second connectors 174 and 176 on th apparatus 170 include slotted tabs 182 and 184, respectively, having slots 186 and 188, respectively, spaced apart by the same distance as the spacing of the studs 178 and 180 such that the studs 178 and 180 may be received in respective slots 186 and 188. Thus, the current sensor 156 within the housing 172 is connected in parallel with a fuse (not shown) connected to a conventional fuse cutout 177. The housing 172 has a transparent cover 190 which extends below one end of the housing to permit a visual indicator, for example, employed as the signaling device, to be viewed from below the housing. Any of the other types of signaling devices described herein may alternatively or additionally be employed.

Figure 13:
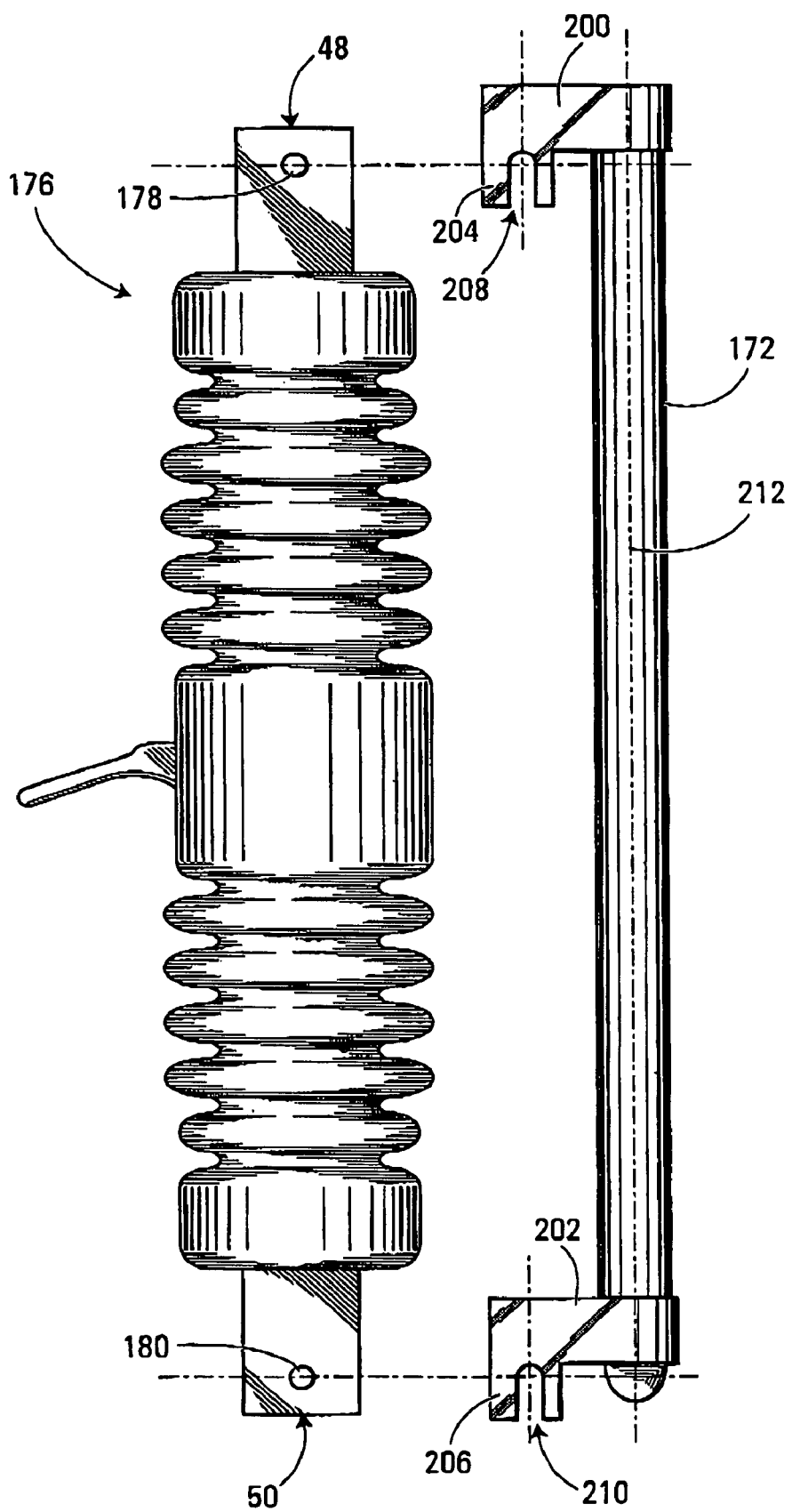
FIG. 13 is a side view of an apparatus according to a fourth embodiment of the invention, operable to be received on line terminals of a conventional fuse cutout, in a manner in which the apparatus is supported on said line terminals.

Alternatively, referring to FIG. 13, an apparatus 192 according to a third alternative embodiment of the invention replaces the first and second connectors 174 and 176 shown in FIG. 12 with different first and second connectors 200 and 202, respectively, at opposite ends of the housing 172. The connectors 200 and 202 have supports 204 and 206, respectively, having slots 208 and 210, respectively, oriented in alignment with each other and parallel to a longitudinal axis 212 of the housing 172. With the slots 208 and 210 oriented in the direction shown in FIG. 13, the apparatus 192 may be placed in proximity to the conventional fuse cutout shown at 177 in FIG. 12 such that the slots 208 and 210 are aligned over the studs 178 and 180 and the studs 178 and 180 may be fully received in the slots 208 and 210. The apparatus 192 is thus held in position by gravity while nuts (not shown) on studs 178 and 180 may be tightened to secure the apparatus to the conventional fuse cutout 177.

The apparatus shown in FIGS. 1 and 2 may be used as a replacement for a conventional fuse cutout. The apparatus shown in FIG. 10 may be used permanently or temporarily in place of a conventional fuse in a conventional fuse cutout and thus requires no special or custom mounting or modification of existing apparatus. In fact, a fuse may be incorporated within the housing alongside the current sensing device or at least in the housing or on the housing, or a separate housing connected to th housing shown may contain a fuse. The apparatus shown in FIGS. 12 and 13 easily fit on existing fuse cutouts and allow conventional fuses to be used with such fuse cutouts without interfering with the operation of fuses and without modifying existing fuse cutouts. In each embodiment, there need not be any moving parts and thus there is no risk of wear or impeded operation such as may be caused by ice, snow or water, and there is no risk of unreliable operation which may otherwise occur due to ageing.

While specific embodiments of the invention have been described and illustrated, such embodiments should be considered illustrative of the invention only and not as limiting the invention as construed in accordance with the accompanying claims.

What is claimed is:

1. A fault condition monitoring apparatus for use with a fuse cutout, the apparatus comprising:
    a housing operable to be supported by the fuse cutout while a fuse is being operatively held by the fuse cutout, said housing having first and second contacts operable to make electrical contact with fuse contacts on said fuse cutout when said housing is supported by said fuse cutout;
    a current sensor inside said housing and connected to said first and second contacts; and
    a signaling device coupled to said current sensor and operable to cause a signal to be produced when current sensed by said current sensor meets a criterion.

2. The apparatus as claimed in claim 1 wherein said housing has a profile of a fuse operable to be held by the fuse cutout.

3. The apparatus as claimed in claim 1 wherein said housing has first and second opposite ends and said first and second contacts are on said first and second opposite ends.

4. The apparatus as claimed in claim 1 wherein said first and second contacts are operable to mechanically mate with said fuse contacts on the fuse cutout.

5. The apparatus as claimed in claim 1 wherein said first and second contacts are operable to mechanically mate with line connectors on the fuse cutout.

6. The apparatus as claimed in claim 1 wherein said first and second contacts include first and second supports respectively, said first and second supports being operable to cooperate with respective line connectors on the fuse cutout to support said housing.

7. The apparatus as claimed in claim 1 wherein at least one of said first and second contacts includes a pull-ring.

8. The apparatus as claimed in claim 1 wherein said current sensor includes a voltage divider connected between said first and second contacts.

9. The apparatus as claimed in claim 8 wherein said voltage divider includes a capacitor network.

10. The apparatus of claim 1 wherein said signaling device includes a visual indicator operable to produce a visual signal operable to be seen from outside said housing.

11. The apparatus of claim 10 wherein said visual indicator includes a light emitting device.

12. The apparatus of claim 11 further comprising a transparent cover disposed at an end of said housing, for covering said light emitting device, while permitting light from said light emitting device to be viewed through said transparent cover.

13. The apparatus of claim 1 wherein said signaling device includes an audible indicator operable to produce an audible signal.

14. The apparatus of claim 1 wherein said signaling device includes a transmitter operable to produce a control signal for reception by a remotely located annunciator.

15. The apparatus of claim 14 further comprising a remotely located annunciator for receiving said control signal from said signaling device.

16. The apparatus of claim 15 wherein said remotely controlled annunciator includes at least one of an audio and visual indicator.

17. A method of monitoring for a fault condition in a system comprising a fuse cutout connected between a supply conductor and an electrical device, the method comprising:
   connecting to the fuse cutout a housing containing a current sensor, such that the current sensor is electrically connected to fuse contacts on said fuse cutout while a fuse is being operatively held by the fuse cutout; and
   actuating a signaling device when current sensed by said current sensor meets a criterion.

18. An apparatus for monitoring for a fault condition in a system comprising a supply conductor and an electrical device, the apparatus comprising the fault condition monitoring apparatus of claim 1 and further comprising a fuse cutout having fuse contacts connected between the supply conductor and the electrical device.

19. The apparatus of claim 18 further comprising a fuse connected between said fuse contacts.

20. A fuse cutout apparatus comprising:
   an insulator;
   first and second fuse contacts on opposite ends of said insulator respectively, for holding a fuse;
   a current sensor inside said insulator and connected to said first and second fuse contacts while a fuse is being operatively held by said fuse contacts; and
   a signaling device coupled to said current sensor and operable to cause a signal to be produced when current sensed by said current sensor meets a criterion.

21. The apparatus as claimed in claim 20 wherein said current sensor includes a voltage divider connected between said first and second contacts.

22. The apparatus as claimed in claim 21 wherein said voltage divider includes a capacitor network.

23. The apparatus of claim 20 wherein said signaling device includes a visual indicator operable to produce a visual signal operable to be seen from outside said insulator.

24. The apparatus of claim 23 wherein said visual indicator includes a light emitting device.

25. The apparatus of claim 24 further comprising a transparent cover disposed at an end of said insulator, for covering said light emitting device, while permitting light from said light emitting device to be viewed through said transparent cover.

26. The apparatus of claim 20 wherein said signaling device includes an audible indicator operable to produce an audible signal.

27. The apparatus of claim 20 wherein said signaling device includes a transmitter operable to produce a control signal for reception by a remotely located annunciator.

28. The apparatus of claim 27 further comprising a remotely located annunciator for receiving said control signal from said signaling device.

29. The apparatus of claim 28 wherein said remotely controlled annunciator includes at least one of an audio and visual indicator.

30. The apparatus of claim 20 further comprising a fuse connected between said fuse contacts.

31. A method of monitoring for a fault condition in a system comprising a supply conductor and an electrical device, the method comprising:
   connecting, between said supply conductor and said electrical device, a fuse cutout having fuse contacts, an insulator and a current sensing circuit connected to said fuse contacts while a fuse is connected to said fuse contacts, said current sensing circuit being located inside said insulator; and
   actuating a signaling device coupled to said current sensing device when current sensed by said current sensing circuit meets a criterion.

32. A fault condition monitoring apparatus for use with a fuse cutout, the apparatus comprising:
   a housing operable to be supported by the fuse cutout while a fuse is operatively connected to the fuse cutout, said housing having first and second contacts operable to make electrical contact with fuse contacts on said fuse cutout when said housing is supported by said fuse cutout;
   current sensing means inside said housing and connected to said first and second contacts for sensing current between said first and second contacts; and
   signaling means coupled to said current sensing means, for causing a signal to be produced when current sensed by said current sensing means meets a criterion.

33. The apparatus as claimed in claim 32, wherein said current sensing means includes a voltage divider connected between said first and second contacts.

34. The apparatus of claim 32 wherein said signaling means includes visual indicating means operable to produce a visual signal operable to be seen from outside said housing.

35. The apparatus of claim 34 wherein said visual indicating means includes a light emitting device.

36. The apparatus of claim 32 wherein said signaling means includes audible indication means for producing an audible signal.

37. The apparatus of claim 32 wherein said signaling means includes transmitting means operable to produce a control signal for reception by a remotely located annunciator.

38. The apparatus of claim 37 further comprising remotely located annunciation means for receiving said control signal from said signaling means.

39. A fuse cutout apparatus comprising:

an insulator;

means for holding a fuse, including first and second fuse contacts on opposite ends of said insulator respectively;

current sensing means inside said insulator and connected to said first and second fuse contacts while a fuse is being operatively held by said means for holding a fuse, for sensing current between said first and second contacts; and signaling means coupled to said current sensing means for causing a signal to be produced when current sensed by said current sensing means meets a criterion.

40. The apparatus as claimed in claim 39 wherein said current sensing means includes a voltage divider connected between said first and second contacts.

41. The apparatus of claim 39 wherein said signaling means includes visual indicating means operable to produce a visual signal operable to be seen from outside said insulator.

42. The apparatus of claim 41 wherein said visual indicating means includes a light emitting device.

43. The apparatus of claim 39 wherein said signaling means includes audible indication means for producing an audible signal.

44. The apparatus of claim 39 wherein said signaling means includes transmitting means operable to produce a control signal for reception by a remotely located annunciator.

45. The apparatus of claim 44 further comprising remotely located annunciation means for receiving said control signal from said signaling means.

* * * * *